US012634109B2

(12) United States Patent
Bedrosian

(10) Patent No.: US 12,634,109 B2
(45) Date of Patent: May 19, 2026

(54) SYSTEMS AND METHODS PATH ASYMMETRY CORRECTION FOR PRECISE TIME TRANSFER AND RANGING SYSTEMS

(71) Applicant: The MITRE Corporation, McLean, VA (US)

(72) Inventor: Paul Stephan Bedrosian, Andover, MA (US)

(73) Assignee: The MITRE Corporation, McLean, VA (US)

( * ) Notice: Subject to any disclaimer, the term of this patent is extended or adjusted under 35 U.S.C. 154(b) by 281 days.

(21) Appl. No.: 18/093,132

(22) Filed: Jan. 4, 2023

(65) Prior Publication Data

US 2023/0361981 A1 Nov. 9, 2023

Related U.S. Application Data

(60) Provisional application No. 63/338,256, filed on May 4, 2022.

(51) Int. Cl.
H04L 7/04 (2006.01)
H04L 7/00 (2006.01)

(52) U.S. Cl.
CPC ............ H04L 7/041 (2013.01); H04L 7/0012 (2013.01); H04L 7/0037 (2013.01)

(58) Field of Classification Search
CPC ..... H04L 7/041; H04L 7/0012; H04L 7/0037; H04W 56/007; H04J 3/0667
See application file for complete search history.

(56) References Cited

U.S. PATENT DOCUMENTS

| 2011/0161701 | A1* | 6/2011 | Blixt | H04J 3/0697 |
| | | | | 713/400 |
| 2013/0194013 | A1* | 8/2013 | Kwak | H03L 7/08 |
| | | | | 327/158 |
| 2013/0195443 | A1* | 8/2013 | Yin | H04J 3/0638 |
| | | | | 398/25 |
| 2019/0088131 | A1* | 3/2019 | Bushnell | G08G 1/161 |

(Continued)

OTHER PUBLICATIONS

Leeb. (Dec. 2000). "Laser Space Communications: Systems, Technologies, and Applications," The Review of Laser Engineering 28(12): 804-808.

(Continued)

*Primary Examiner* — Sun Jong Kim

(74) *Attorney, Agent, or Firm* — Morrison & Foerster LLP

(57) ABSTRACT

Provided herein are systems and methods for synchronizing clocks and determining a range distance between two clocks using one or more timing signals that are communicated between the clocks. The determination can be made to also account for movement between the clocks such as if the clocks are converging (i.e., the distance between them is decreasing over time) or diverging (i., the distance between the clocks is increasing over time.) The systems and methods can utilize timing signals transmitted between two clocks that are synchronizing with another using the precision time protocol. In order to account for the increasing or decreasing distance between the clocks, the systems and methods can utilize Doppler shift data taken between the clocks to apply a correction factor to the timing signals. The timing signals and correction factor can be utilized to also determine a range distance between the clocks.

25 Claims, 10 Drawing Sheets

(56)                    References Cited

U.S. PATENT DOCUMENTS

2022/0007322 A1*  1/2022  Marshall ............ H04B 7/18504
2023/0379072 A1*  11/2023  Xue ................... H04Q 11/0067

OTHER PUBLICATIONS

Leitgeb et al. (Jan. 2008). "Clear Sky Optics" Chapter 4 In Influence of the Variability of the Propagation Channel on Mobile, Fixed Multimedia and Optical Satellite Communications. Laurent Castanet, Shaker Verlag, SatNEx, IST Network of Excellence No. 507052, 84 pages.

* cited by examiner

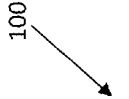
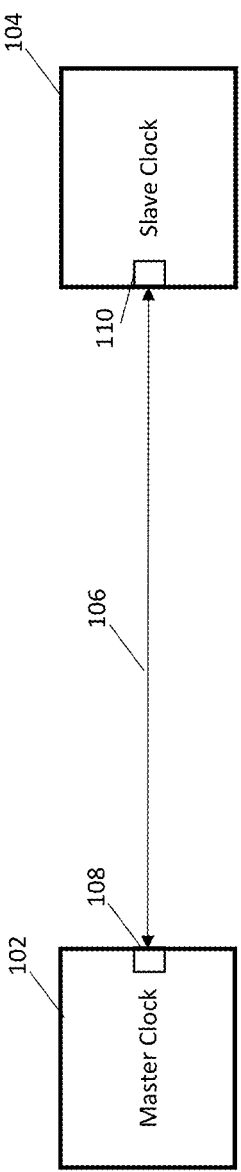
FIG. 1

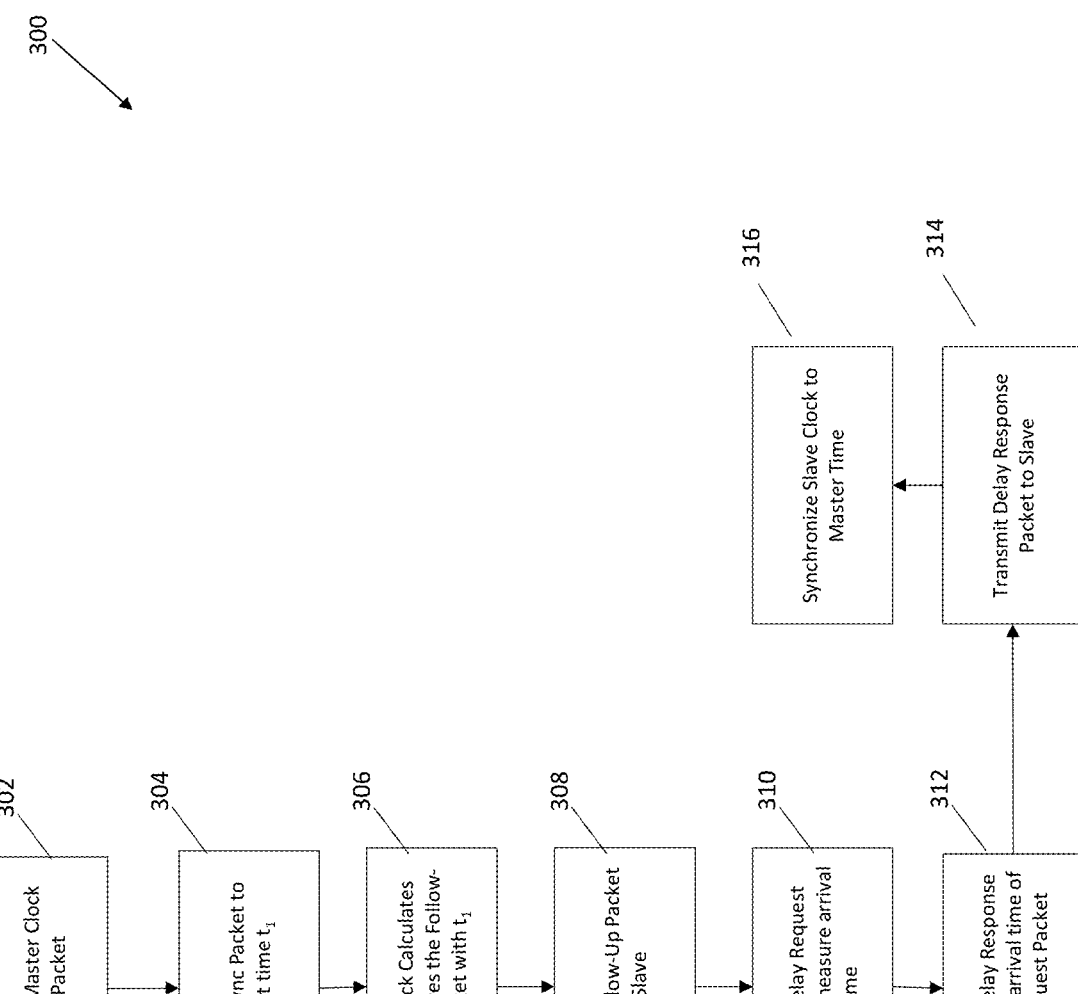

302 Generate Master Clock Sync Packet

304 Transmit Sync Packet to Slave at time $t_1$

306 Master Clock Calculates and Generates the Follow-up Packet with $t_1$

308 Transmit Follow-Up Packet to Slave

310 Receive Delay Request Packet and measure arrival time

312 Generate Delay Response Packet with arrival time of Delay Request Packet

314 Transmit Delay Response Packet to Slave

316 Synchronize Slave Clock to Master Time

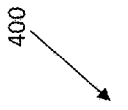
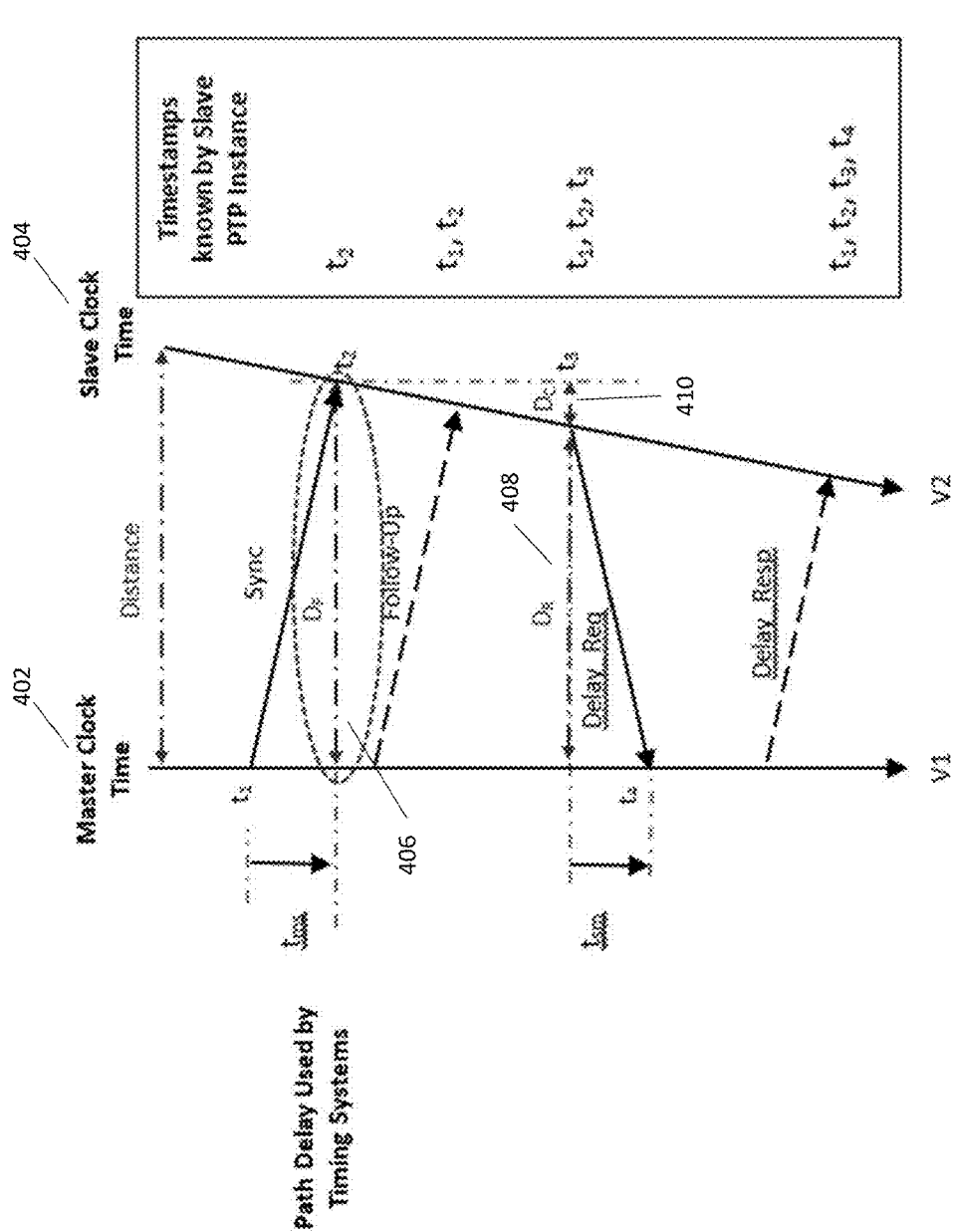
FIG. 4

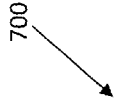
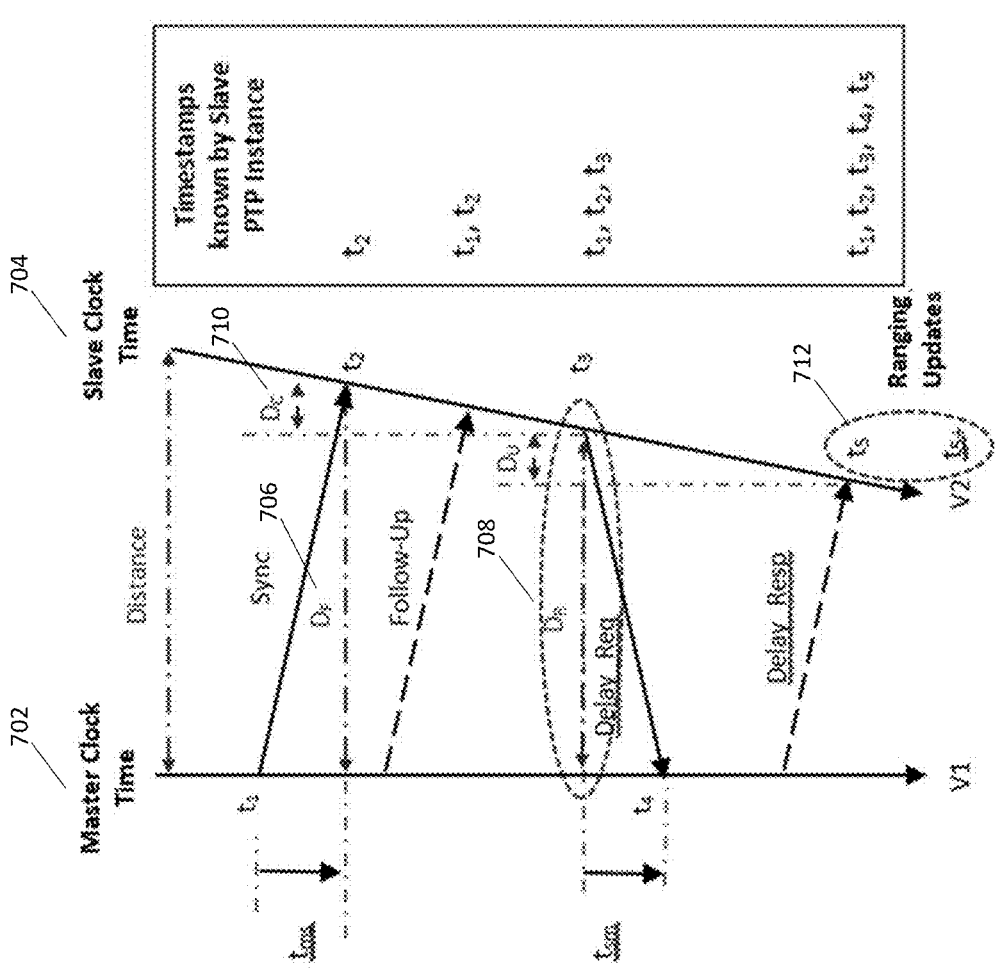
FIG. 7

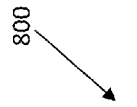
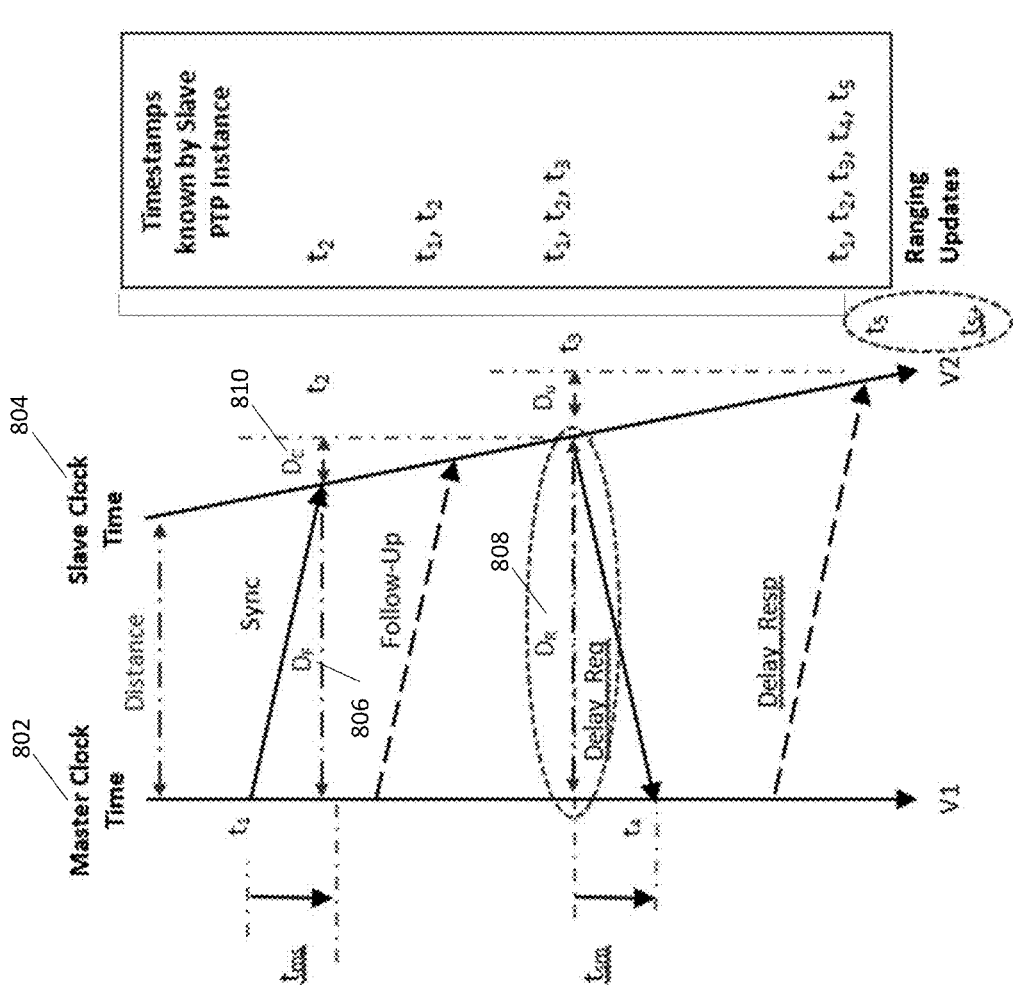
FIG. 8

SYSTEMS AND METHODS PATH ASYMMETRY CORRECTION FOR PRECISE TIME TRANSFER AND RANGING SYSTEMS

CROSS REFERENCE TO RELATED APPLICATION

This application claims the benefit of U.S. Provisional Application No. 63/338,256, filed May 4, 2022, the entire contents of which is incorporated herein by reference.

FIELD OF THE DISCLOSURE

This disclosure relates to a precision time transfer protocol clock synchronization scheme that corrects for motion-induced path asymmetry between a Master and Slave Clock during the synchronization process.

BACKGROUND OF THE DISCLOSURE

The need to synchronize system time clocks to a common timescale using precise time transfer (PTT) techniques is becoming increasingly more important for both terrestrial and space-based applications. PTT protocols developed specifically for the high accuracy transfer of time take into account path delays using specialized techniques including hardware timestamping, two-way protocol exchange and control plane management. The IEEE Std 1588™-2019 Standard for a Precision Time protocol (PTP) for Networked Measurement and Control Systems has become an industry standard method of transporting high precision time over data networks. However, the use of PTP standards such as IEEE 1588 has implementation challenges in terrestrial and space-based time transfer applications when the transmitter, receiver, or both are in motion relative to one another.

One shortcoming of conventional industry PTT protocols is their dependence on a stable physical layer, in which it is assumed that the transmitter and receiver's communication path distance with respect to one another is stable or non-varying. For instance, conventionally, data transport over a fiber-based communication infrastructure is commonly assumed by these protocols where path delays tend to be stable. More importantly the forward and reverse path delays are also assumed to be stable or "known" to allow these protocols to accurately compute and correct for the path delay between clocks.

However, for satellite systems that transfer traceable time to other satellites in the same or different orbits (e.g., LEO, MEO, GEO or HEO) or with ground stations, the accuracy of time recovered using conventional industry PTT protocols may be affected by motion-induced path asymmetry. In other words, if the distance between two clocks that are attempting to synchronize using PTT protocols varies during the synchronization process, then the process' assumption and reliance on a stable forward and reverse path delays may lead to inaccurate synchronization outcomes. If not corrected, the receive clock will reflect this asymmetry as a dynamically varying time error that may not meet the timing accuracy needed for mission critical operation. Further, if time is distributed over a chain of satellite-based clocks, this time error will tend to accumulate.

Although PTP is well suited for synchronizing stationary terminals over a fixed communication infrastructure, it is not able to accurately measure and correct for distance variations between mobile terminals that occur during the exchange of PTP messages between Master and Slave Clocks.

Free-space optical communication systems routinely use measurements of the Doppler shift between two communicating terminals to correct for shifts in the receive wavelength. These Doppler shift measurements can also be used to measure the instantaneous differential velocity between these two clock terminals and thus compute a path change over a given time interval to correct for receive time error caused by the motion induced path asymmetry. A PTT protocol that incorporates Doppler shift measurements could enable the use of such protocols in space-based and terrestrial based clock synchronization schemes in which the master and slave clocks are moving with respect to one another. Thus, what is needed is a system and method that can utilize Doppler shift measurements to provide a robust synchronization solution for clocks in which the motion of one or both clocks that are attempting to synchronize with one another create a path asymmetry.

SUMMARY OF THE DISCLOSURE

According to one or more examples of the disclosure, systems and methods are provided that are configured to synchronize two independent clocks, even if the distance between the clocks is changing over time. In one or more examples, the systems and methods described herein can utilize a synchronization protocol coupled with doppler measurements to not only synchronize the clocks, but to also determine the range (i.e., distance between the clocks).

According to one aspect of the disclosure, a method for synchronizing a first clock and a second clock comprises: determining a forward transmission path delay for communications transmitted from the first clock to the second clock, synchronizing the second clock to the first clock based on the determined forward transmission path delay, receiving a Doppler shift measurement, wherein the Doppler shift measurement is based on a signal transmitted from the first clock and received at the second clock, determining a transmission path delay correction factor based on the received Doppler shift measurement, and adjusting a time of the second clock based on the determined transmission path delay correction factor.

Optionally, determining the forward transmission path delay for communications transmitted from the first clock to the second clock comprises: generating a Sync packet at the first clock, wherein the synchronization packet comprises time stamp information from a first clock, transmitting the generated Sync packet to a second clock, determining an internal delay of the first clock signal, wherein the determined internal delay is based on an amount time measured between when the Sync packet was generated and when the Sync packet was transmitted, receiving a delay request packet from the second clock at the first clock; and determining the transmission path delay between the first clock and the second clock based on the received delay request packet.

Optionally, adjusting the time of the second clock based on the determined transmission path delay correction factor comprises: transmitting a delay response packet to the second clock from the first clock, wherein the delay response packet comprises the determined transmission path delay, and adjusting the time of the second clock based on the received delay response packet.

Optionally, the received Doppler shift is based on a signal transmitted from the first clock to the second clock.

Optionally, the received Doppler shift measurement is based on a change in the received frequency of the signal transmitted from the first clock to the second clock.

Optionally, the method comprises determining that a distance between the first clock and the second clock is increasing or decreasing based on the received Doppler shift measurement.

Optionally, adjusting the time of the second clock based on the determined transmission path delay correction factor comprises: determining a reverse transmission path delay for communications transmitted from the second clock to the first clock, and modifying the determined reverse transmission path delay based on the received Doppler shift measurement.

According to an aspect of the disclosure, a method for determining a range distance between a first clock and a second clock comprises: determining a forward transmission path delay for communications transmitted from the first clock to the second clock, synchronizing the second clock to the first clock based on the determined forward transmission path delay, receiving a Doppler shift measurement, wherein the Doppler shift measurement is based on a signal transmitted from the first clock and received at the second clock, determining a transmission path delay correction factor based on the received Doppler shift measurement, and determining a range distance between the first clock and the second clock based on the determined transmission path delay correction factor.

Optionally, determining the forward transmission path delay for communications transmitted from the first clock to the second clock comprises: generating a synchronization packet at the first clock, wherein the synchronization packet comprises time stamp information from a first clock, transmitting the generated synchronization packet to a second clock, determining an internal delay of the first clock signal, wherein the determined internal delay is based on an amount time measured between when the synchronization packet was generated and when the synchronization packet was transmitted, receiving a delay request packet from the second clock at the first clock; and determining the transmission path delay between the first clock and the second clock based on the received delay request packet.

Optionally, adjusting the time of the second clock based on the determined transmission path delay correction factor comprises: transmitting a delay response packet to the second clock from the first clock, wherein the delay response packet comprises the determined transmission path delay, and adjusting the time of the second clock based on the received delay response packet.

Optionally, the received Doppler shift measurement is based on a signal transmitted from the first clock to the second clock.

Optionally, the received Doppler shift measurement is based on a change in the frequency of the signal transmitted from the first clock to the second clock.

Optionally, the method comprises determining that a distance between the first clock and the second clock is increasing or decreasing based on the received Doppler shift measurement.

Optionally, determining the range distance between the first clock and the second clock based on the determined transmission path delay correction factor comprises: determining a reverse transmission path delay for communications transmitted from the second clock to the first clock, and modifying the determined reverse transmission path delay based on the received Doppler shift measurement.

In one or more examples, the method described above can be implemented by a system including one or more general purpose processors that can execute software stored in a non-transitory storage medium.

BRIEF DESCRIPTION OF THE FIGURES

FIG. 1 illustrates an exemplary clock synchronization network according to examples of the disclosure.

FIG. 3 illustrates an exemplary PTP process according to examples of the disclosure.

FIG. 4 illustrates an exemplary application of a PTP process to a context in which a distance between the Master and Slave Clocks are converging during the synchronization process according to examples of the disclosure.

FIG. 7 illustrates an exemplary timing diagram for using clock synchronization information to determine ranging information according to examples of the disclosure in a context where the Master Clock and Slave Clock are converging according to examples of the disclosure.

FIG. 8 illustrates an exemplary timing diagram for using clock synchronization information to determine ranging information according to examples of the disclosure in a context where the Master Clock and Slave Clock are diverging according to examples of the disclosure.

DETAILED DESCRIPTION OF THE DISCLOSURE

Figure 2:
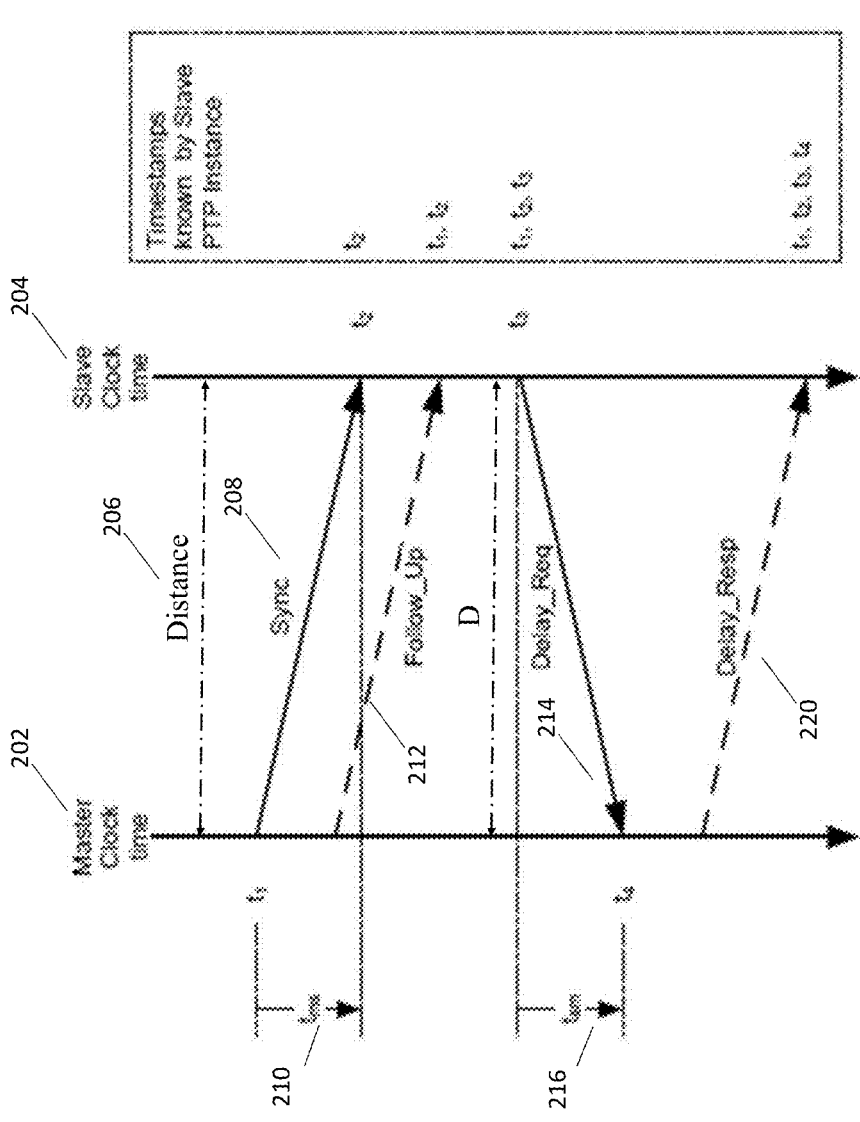
FIG. 2 illustrates an exemplary Precision Time Protocol (PTP) timing diagram according to examples of the disclosure.

In the following description of the disclosure and embodiments, reference is made to the accompanying drawings in which are shown, by way of illustration, specific embodiments that can be practiced. It is to be understood that other embodiments and examples can be practiced, and changes can be made, without departing from the scope of the disclosure.

In addition, it is also to be understood that the singular forms "a," "an," and "the" used in the following description are intended to include the plural forms as well unless the context clearly indicates otherwise. It is also to be understood that the term "and/or" as used herein refers to and encompasses all possible combinations of one or more of the associated listed items. It is further to be understood that the terms "includes," "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follow are presented in terms of algorithms and symbolic representations of operations on data bits within a computer memory. These algorithmic descriptions and representations are the means used by those skilled in the data processing arts to convey the substance of their work most effectively to others skilled in the art. The algorithm here is generally conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times to refer to certain arrangements of steps requiring physical manipulations of physical quantities as modules or code devices without loss of generality.

However, all of these and similar terms are to be associated with the appropriate physical quantities and are merely convenient labels applied to these quantities. Unless specifically stated otherwise as apparent from the following discussion, it is appreciated that, throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of an algorithm. It should be noted that the process steps and instructions of the present disclosure could be embodied in software, firmware, or hardware, and, when embodied in software, they could be downloaded to reside on and be operated from different platforms used by a variety of operating systems.

The present disclosure also relates to a device for performing the operations herein. This device may be specially constructed for the required purpose, or it may comprise a general-purpose computer selectively activated or reconfigured by a computer program stored in the computer. Such a computer program may be stored in a non-transitory, computer-readable storage medium such as, but not limited to, any type of disk, including floppy disks, optical disks, CD-ROMs, magnetic-optical disks, read-only memories (ROMs), random access memories (RAMs), EPROMs, EEPROMs, magnetic or optical cards, application-specific integrated circuits (ASICs), or any type of media suitable for storing electronic instructions and each coupled to a computer system bus. Furthermore, the computers referred to in the specification may include a single processor or may be architectures employing multiple processor designs for increased computing capability.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

Provided herein are systems and methods for synchronizing clocks and determining a range distance between two clocks using one or more timing signals that are communicated between the clocks. In one or more examples, the determination can be made to also account for movement between the clocks such as if the clocks are converging (i.e., the distance between them is decreasing over time) or diverging (i.e., the distance between the clocks is increasing over time.) In one or more examples, the systems and methods described herein can utilize timing signals transmitted between two clocks that are synchronizing with another using the precision time protocol. In order to account for the increasing or decreasing distance between the clocks, in one or more examples, the systems and methods described herein can utilize Doppler shift data taken between the clocks to apply a correction factor to the timing signals that accounts for the increasing or decreasing distance.

Synchronizing clocks, in other words, ensuring that two separate clocks are set to the exact same time has many applications across many different contexts. For instance, in computing networks, the internal clocks of the various components within the network should have synchronized clocks so that actions and processes involving the computing network can be coordinated from a time perspective. If clocks are not synchronized, then in one or more examples, it may be difficult or impractical for the network to perform certain mission critical operations which require that two separate computing devices of the network (each with its own clock) perform actions that are synchronized with one another. Clock synchronization is also needed in spaced-based and terrestrial communications network in which a transmitter transmits data to a receiver that is physically located away from one another. In the communications context, clock synchronization can often allow for the receiver to accurately demodulate signals received from the transmitter and allow for the receiver to perform ranging calculations to determine its distance from the transmitter's clock.

Clock synchronization may also be needed to overcome the fundamental challenges that limit the accuracy of the Global Positing system (GPS) in degraded or denied environments. The use of PTT protocols to synchronize clocks over a communication path is inherently different from systems that rely on GPS for timing. The PTT approach of collaboratively distributing time and healing network faults differs significantly from the approach used by the Global Positioning System (GPS), since PTT can transport time between clocks through specialized data networks with accuracies equivalent to or better than those provided by placing GPS receivers at each network node.

In one or more examples, the IEEE 1588 precision time protocol (PTP) can be used to synchronize PTP time clocks over a data network connection to form a common PTP domain controlled by a Grandmaster Clock (GM). This process is based on transferring the GM timescale from a source clock (Master Clock) to a synchronizing clock (Slave Clock) using a set of packet-based messages over a common communication infrastructure. In one or more examples, the PTP process employs a defined set of timestamped special purpose messages that are exchanged between the Master Clock and the Slave Clock that are used to synchronize the Slave Clock to the Master Clock. In one or more examples, and as described in detail below, the PTP process can be used to synchronize clocks in a manner that accounts for internal transmission delays (i.e., the time it takes for a message that is time stamped by a transmitter to actually be transmitted) as well as propagation delays that are caused due to the physical distance and medium over which messages are sent from the Master Clock to the Slave Clock.

In one or more examples, and as explained in further detail below, one of the end results of the synchronization process includes determining a path delay between the Master and Slave Clock that is incurred due to the physical distance and the propagation delay experienced by messages transmitted between the Master and Slave Clocks due to the physical communication path between the two clocks.

FIG. 1 illustrates an exemplary clock synchronization network according to examples of the disclosure. In the example of FIG. 1, system 100 can include two separate clocks, Master Clock 102 and Slave Clock 104. While the example system 100 of FIG. 1 only includes two clocks, the disclosure should not be seen as limiting and the systems and methods described herein in can be applied to a system with any number of clocks. In one or more examples, Master Clock 102 and Slave Clock 104 can be synchronized such that Slave Clock 104 adjusts its time setting to match the time kept by Master Clock 102. In this way, the time reading on Master Clock 102 will determine the time setting on Slave Clock 102.

In one or more examples, the Master Clock 102 and the Slave Clock 104 can be interconnected with one another via communications link 106. In one or more examples, communication link 106 can be configured to enable Master Clock 102 and Slave Clock 104 to pass messages/information to one another through the link. In one or more examples, communication link 106 can be implemented as a wired link (i.e., Ethernet, fiber, etc.) or a wireless link (i.e., RF or Optical link). In one or more examples, and as described in further detail below, an amount of time that a message that is transmitted from either Master Clock 102 or Slave Clock 104 to the other clock can be based on the physical medium used to implement link 106 and/or the physical distance between Master Clock 102 and Slave Clock 104.

In one or more examples, each of Master Clock 102 and Slave Clock 104 can include a communications port 108 and 110 respectively. In one or more examples, a message generated by Master Clock 102 can first be created by the Master Clock 102 and then sent to communications port 108 for transmission to Slave Clock 104. Similarly, a message generated by Slave Clock 104 can first be created by Slave Clock 104 and then sent to communications port 110 for transmission to Master Clock 102. In one or more examples, there may be a "delay" (i.e., an amount of time) between when a message is created to when it is transmitted by either the Master Clock 102 or the Slave Clock 104. As described in further detail below, this "delay" may need to be accounted for when synchronizing the Slave Clock 104 to the Master Clock 102.

In one or more examples, synchronizing the Slave Clock 104 to the Master Clock 102 may not be as simple as recording the time on the Master Clock 102 and transmitting it to Slave Clock 102. In one or more examples, there may be a delay between when the time of the Master Clock 102 is noted, transmitted to the Slave Clock 104, received at Slave Clock 104, and then used to update the Slave Clock 104. Thus, as an example, if the Master Clock 102 generates a message to Slave Clock 104, informing Slave Clock 104 that its time is 200 ms after midnight, by the time the message is transmitted and received by Slave Clock 104, 50 ms may have passed. Thus, even if Slave Clock 104 immediately updates its time reading to match the time in the message received from Master Clock 102, the time may not be still synchronized with Master Clock 102 by 50 ms which can be equal to the amount of delay between the creation of the time stamp message and its receipt by Slave Clock 104. Thus, in one or more examples, a process may be required, which will synchronize the Slave Clock 104 to the Master Clock 102 and that takes into account the various delays in time required for messages to be transmitted and received. In one or more examples, one such process can include a Precision Time Protocol (PTP) that when utilized can be configured to ensure that the Master Clock 102 and Slave Clock 104 are synchronized in a manner that takes into account delays associated with message transmission and message reception caused by propagation delay due to distance between the Master Clock 102 and Slave Clock 104. In one or more examples, a path delay measurement mechanism can be employed by PTP Slave Clocks that recover and maintain accurate time using two-way time transfer as described in further detail below.

FIG. 2 illustrates an exemplary Precision Time Protocol (PTP) timing diagram according to examples of the disclosure. In one or more examples, the timing diagram 200 of FIG. 2 can illustrate the timing of messages that are exchanged between a Master Clock and a Slave Clock during a PTP process configured to synchronize a Slave Clock to a Master Clock. Thus, in one or more examples, the timing diagram 200 of FIG. 2 includes a Master Clock timeline 202 and a Slave Clock timeline 204. In one or more examples, the Master Clock and the Slave Clock are located a distance 206 away from one another such that when a message is sent from the Master Clock (i.e., from Master Clock timeline 202) to the Slave Clock, the message will travel a distance 206 before it can arrive at the Slave Clock. Thus, in one or more examples, since the message must travel over a distance 206 to arrive at the Slave Clock and thus the message rather than arriving instantaneously at the Slave Clock, will instead arrive after a certain amount of time has passed owing to the propagation delay caused by the distance 206. The timing diagram 200 of FIG. 2 will be referenced when describing a PTP message exchange process as outlined below with respect to FIG. 3.

FIG. 3 illustrates an exemplary PTP message exchange process according to examples of the disclosure. In one or more examples, the process 300 of FIG. 3 can be applied to both a Master Clock and Slave Clock that are in communication with one another similar to the example described above with respect to FIG. 1. In one or more examples, the process 300 of FIG. 3 can begin at step 302 wherein a Sync packet is generated by the Master Clock. In one or more examples, a Sync packet can include a time stamp that is generated by reading the time on the Master Clock at the moment when the Sync packet is generated. Thus, the Sync packet generated at step 302 can include the exact reading of the Master Clock at the moment the Sync packet was generated. In one or more examples, once the Sync packet has been generated by the Master Clock at step 302, the process 300 can move to step 304 wherein the Sync packet is transmitted to the Slave clock. Referring back to FIG. 2, the transmission of the Sync packet from the Master Clock to the Slave Clock is reflected at 208, wherein the Sync packet is transmitted at a time $t_1$ (according to the Master Clock timescale 202) and received by the Slave Clock at time $t_2$ (according to the Slave Clock timescale 204.) The time it takes for the Sync packet 208 to travel from the Master Clock to the Slave Clock can be reflected as $t_{ms}$ (i.e., the forward path delay) (illustrated at 210) wherein the forward path delay is proportional to the distance 206 between the Master Clock and the Slave Clock. The Slave Clock while knowing time $t_2$, may not know the exact value of time $t_1$ since the timestamp included in the Sync packet does not account for the internal delay of the Master Clock described below.

As described above with respect to FIG. 1, there can be a delay between the time when the Master Clock timestamp is recorded for the Sync packet, and the time at which the Sync is actually transmitted, thus in one or more examples, once the sync packet has been transmitted at step 304, the process 300 can move to step 306 wherein the internal delay (i.e., the time between when the timestamp of the Master Clock was taken and the time it was actually transmitted to the Slave Clock) can be determined. In one or more examples, the internal delay can be determined by noting the time at which the sync packet was actually transmitted.

In one or more examples, as part of step 306, the Master clock can generate a "follow-up" packet based on the determined internal delay. Once the delay has been determined (or the time at which the sync packet was actually transmitted was noted) at step 306 and the follow up packet generated, the process 300 can move to step 308 wherein the "follow-up" packet is transmitted from the Master Clock to the Slave Clock. Referring to the time diagram 200 of FIG. 2, the "follow-up" packet transmitted from the Master Clock to the Slave Clock is indicated at 212. Upon receipt of the follow-up packet, the Slave Clock can have knowledge of time $t_2$ (i.e., the time when the Sync Packet was received according to the Slave Clock) but can now also have knowledge of time $t_1$ (i.e., the precise time according to the Master Clock that the Sync packet was transmitted). In one or more examples, if the Slave Clock was simply synchronized to successive received values of $t_1$, the Master Clock and the Slave Clock would not be accurately synchronized since the Slave Clock's time would lag the Master Clock time by the propagation delay experienced by the Sync packet owing to the distance (and communications medium used) between the two clocks. Thus, upon the completion of step 308, the Slave Clock's time can still lag the Master Clock time by the propagation delay. Thus, in one or more examples, the Slave Clock may require further information to determine the propagation delay and thereby be fully synchronized to the Master Clock.

In one or more examples, once the follow up packet is transmitted at step 308, a delay request packet can be transmitted from the Slave Clock and received by the Master Clock at step 310, and as indicated in FIG. 2 at 214. Upon receiving the delay request packet, the Master Clock can measure the arrival time of the received delay request packet. In one or more examples, the delay request packet can be specifically configured to allow for the Slave Clock to gather further information about the propagation delay between the Master Clock and the Slave Clock, so that the Slave Clock can be synchronized with the Master Clock. In one or more examples, the delay request packet may not have a timestamp transmitted as part of the packet, but the Slave Clock can keep track of the time when the delay request packet was transmitted (i.e., $t_3$ illustrated in FIG. 2). Once the delay request packet is received by the Master Clock, the Master Clock can note the time that the delay request packet was received (i.e., $t_4$ illustrated in FIG. 2). In one or more examples, once the delay request packet has been received by the Master Clock at step 310, the process 300 can move to step 312, wherein a delay response packet is generated by the Master Clock as shown in FIG. 2 at 220. In one or more examples, generating the delay response packet can include providing the time when the delay request packet was received (i.e., $t_4$ as illustrated in FIG. 2) by the Master Clock. In one or more examples, once the delay packet has been generated at step 312, the process 300 can move to step 314 wherein the delay response packet is transmitted to the Slave Clock.

In one or more examples, upon the completion of step 314, the Slave Clock will have knowledge of four time events as illustrated in FIG. 2. Specifically, the Slave Clock will have knowledge of $t_1$ (the time at which the Sync packet was generated according to the Master Clock), $t_2$ (the Sync message arrival time at the Slave Clock), $t_3$ (the time at which the delay request message was sent from the Slave Clock), and $t_4$ (the time at which the delay request message was received by the Master Clock). Using these four separate times that have been ascertained by steps 302-314 of FIG. 3, the process 300 can move to step 316 wherein the Slave Clock synchronizes itself to the Master Clock.

In one or more examples, synchronizing the Slave Clock to the Master Clock can include determining the mean path delay, which can be calculated using timestamps $t_1$ to $t_4$ described above. In one or more examples, the mean path delay can be represented as the forward propagation delay $t_{ms}$ 210 and the reverse propagation delay $t_{sm}$ 216 which can represent the propagation delay from the Slave Clock to the Master Clock. In one or more examples, the mean path delay can be calculates using equation 1 below:

$$<meanPathDelay> = \frac{t_{ms} + t_{sm}}{2} \qquad \text{Equation 1}$$

In one or more examples, the nominal measure value of the mean path delay can be computed using the PTP timestamps $t_1$ to $t_4$ acquired using the process described above. Specifically, the mean path delay can be calculated using equation 2 below:

$$<meanPathDelay>=[(t_2-t_1)+(t_4-t_3)]/2=[(t_2-t_3)+(t_4-t_1)]/2 \qquad \text{Equation 2}$$

For fixed terminals (i.e., a fixed Master and Slave Clock), the accuracy of the computed value of <meanPathDelay> can be dependent on the symmetry of the forward and reverse path delays. In one or more examples, the basic PTP assumption can be that the forward and reverse path delays are equal. Therefore, the values of $t_{ms}$ and $t_{sm}$ can be assumed to be equal. For this assumption to be valid, the path length (D) between the Master and Slave Clock terminals must be stable over the course of the PTP timestamp exchange such that the forward and reverse propagation delays are substantially the same.

For example, assuming an optical link is used to transmit communications between a Master Clock and the Slave Clock, and if an ideal optical propagation speed equal to the speed of light is assumed, then a time error of 3.33 ns exists for each meter of path difference. For a timing application requiring less than 1 microsecond of time error over a 1 hop network, the maximum PTP path asymmetry can be no greater than 2 μs. This translates to a maximum path length difference of less than ~600 meters over this interval. Thus, in one or more examples, the PTP process outlined above with respect to FIG. 3 may not be adequate in instances wherein the forward and reverse path delays are asymmetrical (i.e., one of the clocks is moving closer to or diverging away from the other).

To put this into perspective, if it takes 1 second for a full set of PTP messages to be exchanged between two PTP clocks, the maximum differential velocity between PTP clocks can be no greater than 600 m/s to meet a 1 microsecond time error limit. A free-space optical link between LEO and GEO satellites (as an example) can experience a differential velocity of 7.75 km/s. Therefore, in order to maintain a maximum path asymmetry of less than 600 meters, the exchange of a full set of PTP messages would need to occur within a time period of ~77 ms. The ability to meet this shorter messaging interval can depend on the characteristics of the full-duplex communication channel between the two clock nodes and may not be feasible in all cases.

In practice, however, PTP messages flow over a network of clock nodes, and the maximum time error applies to all clock nodes, especially the last clock node. Since time error tends to accumulate with each successive clock node, the maximum path asymmetry between each node in the network would have to be significantly smaller than the one in this example. However, with the ability to compensate for asymmetry caused by motion induced path delay between PTP clocks, it becomes feasible to meet time accuracy requirements for large differential velocities with lower PTP message rates. As described below, the process 300 described above with respect to FIG. 3 can be modified with additional information that can be used to synchronize a Slave Clock to a Master Clock in instances wherein the distance between these clocks is not stable due to differential path changes.

FIG. 4 illustrates an exemplary application of a PTP process to a context in which a distance between the Master and Slave Clocks are converging during the synchronization process according to examples of the disclosure. The timing diagram 400 of FIG. 4 illustrates the exchange of PTP messages between Master and Slave Clocks where the length of the communication path changes over time. In one or more examples, the Master Clock's movement is represented as vector (V1) indicated at 402 and the Slave Clock's movement is illustrated as vector (V2) indicated at 404. In one or more examples, vectors 402 and 404 can be converging, meaning that the motion of V2 (the Slave Clock) is moving closer to the Master Clock and therefore the relative path distance between these two vectors is decreasing over time.

In one or more examples, the path distance for the Sync message (forward delay) can be labeled as $D_F$ indicated at 406 and the path distance for the Delay-Req message (reverse delay) can be represented as $D_R$ as indicated at 408. In contrast to the example of FIG. 2 in which $D_F$ and $D_R$ were substantially equal, in the example timing diagram 400 of FIG. 4, these path lengths may differ by a distance $D_C$ as indicated at 410 over the course of exchanging PTP messages. In one or more examples, the value of $D_R$ can be less than $D_F$ and therefore, the value of $t_{ms}$ (the forward path delay) will be greater than $t_{sm}$ (the reverse path delay.) In one or more examples, since the accuracy of the PTP path delay measurement can be based on accurately characterizing the value of tms (the actual delay of the Sync message), a path correction value needs to be determined to make the forward path distance equal to the reverse path distance. Therefore, the relationship between the forward path ($D_F$), reverse path ($D_R$) and correction path ($D_C$) distances can be summarized by equation 3 below:

$$D_F=D_R+D_C \hspace{2cm} \text{Equation 3}$$

In one or more examples, if the value of $D_C$ can be determined, it can be used in the PTP mean path delay equation (described above) to correct the reverse path delay. If the free-space speed of light is assumed equal to c (speed of light in a vacuum), then the time it takes light to traverse the distance $D_C$ can be given by the following equation, where $T_C$ is the time it takes for a signal to traverse the distance $D_C$. This relationship is shown by the following equation.

$$T_C=D_C/c \hspace{2cm} \text{Equation 4}$$

In one or more examples, the value of $T_C$ can now be used to correct for the free-space path delay difference between $t_{ms}$ (forward delay) and $t_{sm}$ (reverse delay) by increasing the value of the reverse path delay. Increasing the value of the reverse path delay by $T_C$ can allow for a more accurate synchronization since any time error of the calculated propagation delay caused by the asymmetry between the forward propagation and the reverse propagation delay may be mitigated. The relationship between the forward path delay and the reverse path delay in instances where the Master and Slave Clocks are converging can be expressed using equation 5 below.

$$t_{ms}=t_{sm}+T_C \hspace{2cm} \text{Equation 5}$$

Using the PTP timestamps (acquired using the process 300 of FIG. 3) and the value of $T_C$, the reverse path corrected value of the mean path delay can be computed using equation 6 below:

$$<\text{meanPathDelay\_cR1}>=[(t_2-t_1)+(t_4-t_3)+T_C]/2=[(t_2-t_3)+(t_4-t_1)+T_C]/2 \hspace{1cm} \text{Equation 6}$$

The process of updating the value of <meanPathDelay_cR1> can be ongoing and performed by the Slave Clock so as to ensure that the accuracy of the synchronization is high. In one or more examples, the difference between the approach specified by the process 300 described above with respect to FIG. 3 and the approach in which the clocks are in motion relative to one another, is the addition of the correction time value $T_C$ that addresses the degradation of accuracy due to path asymmetry during the exchange of a set of PTP timestamps.

Figure 5:
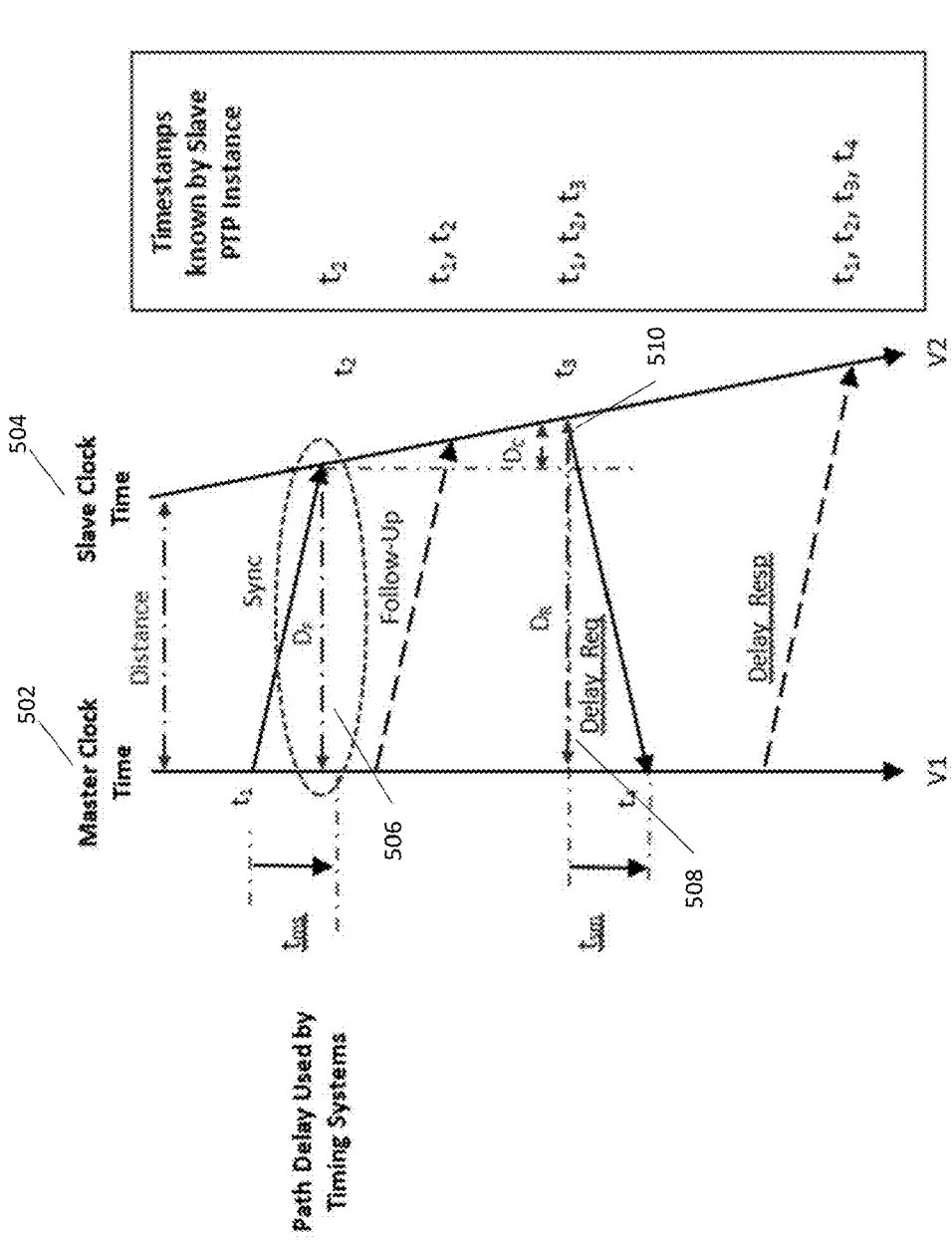
FIG. 5 illustrates an application of a PTP process to a context in which a distance between the Master and Slave clocks are diverging during the synchronization process according to examples of the disclosure.

In one or more examples, the concepts described above with respect to FIG. 4 can also be applied to a context in which the Slave Clock and the Master Clock are diverging with respect to on another. FIG. 5 illustrates an application of a PTP process to a context in which a distance between the Master and Slave Clocks are diverging during the synchronization process according to examples of the disclosure. The timing diagram 500 of FIG. 5 illustrates the exchange of PTP messages between Master and Slave Clocks where the length of the communication path changes over time. In one or more examples, the Master Clock's movement is shown as vector (V1) indicated at 502 and the Slave Clock's movement as shown as vector (V2) indicated at 504. In one or more examples, vectors V1 at 502 and V2 at 504 are diverging, and therefore the relative path distance between these two vectors is increasing over time. Thus, during a PTP synchronization process the forward delay path can be shorter than the reverse delay path, thus meaning that the mean delay path without correction may not result in accurate synchronization of the Slave Clock to the Master Clock.

In one or more examples, note that the path distance for the Sync message ($D_F$) indicated at 506 is less than the distance measured by the Delay_Req and Delay_Resp mechanism ($D_R$) indicated at 508. Similar to the example of timing diagram 400 of FIG. 4 wherein the vectors V1 and V2 are converging, the path length difference between these two measurements is $D_C$ as indicated at 510. In contrast to the example of timing diagram 400 however, the reverse path length is longer than the forward path length and thus $D_C$ can be added to $D_F$ to make the total length of the forward path equal to the distance of the reverse path. In one or more examples, a time correction value $T_C$ can be determined that corresponds to the message propagation over distance $D_C$. As with the converging path case, the magnitude of $T_C$ can be determined by using Equation 4 above. In one or more examples, the value of $T_C$ can now be used to correct for the asymmetry between tms (forward delay) and tsm (reverse delay) by decreasing the value of the reverse delay as shown in the following equation:

$$t_{ms} = t_{sm} - T_C \qquad \text{Equation 7}$$

As can be seen from the equation above, the difference from the converging time case is that the value of $T_C$ is subtracted from tsm to reduce the reverse path delay and make it equal to the forward path delay. Using the set of PTP timestamps and the value of $T_C$, the reverse path corrected value of the mean path delay <meanPathDelay_cR2> is computed using the following equation:

$$\text{<meanPathDelay\_cR2>} = [(t_2 - t_1) + (t_4 - t_3) - T_C]/2 = [(t_2 - t_3) + (t_4 - t_1) - T_C]/2 \qquad \text{Equation 8}$$

As discussed above, in both the converging and diverging scenarios, a correcting time $T_C$ can be used to correct for either the forward or reverse path delays between two mobile systems. Using the PTP message passing algorithm alone (described above with respect to FIG. 3), accurately determining the value of $T_C$ may not be possible, since the time information harvested from PTP process may not be able to account for the asymmetry between the forward and reverse paths in a scenario in which the Master and Slave Clocks are moving closer or farther apart from each other during the clock synchronization process. Therefore, in one or more examples, a secondary mechanism is needed to determine the value of $T_C$ based on the corresponding value of $D_C$. In one or more examples, Doppler shift information can be used to compute the differential velocity between two PTP clocks based on the corresponding Doppler shift measurements. Since PTP is a time-based system, the time between the receipt of a Sync message and the transmission of the Delay_Req message (timestamps $t_2$ and $t_3$ described above) are already known by the Slave Clock through the PTP process described above with respect to FIG. 3. By coordinating the differential velocity measurements with the PTP message exchange, these measurements can be used to correct for changes in either the forward or reverse path delays caused by differential path movement between the Master and Slave Clocks.

In one or more examples, a Doppler shift can refer to the change in frequency of a wave in relation to an observer who is moving relative to the wave source. In the context of the Master and Slave Clock, if a wave is emitted from the Master Clock, then the frequency of the wave observed at the Slave Clock may increase or decrease depending on whether the Slave Clock is moving closer to the Master Clock or farther away from the Master Clock. Equation 9 below can be used to determine the Doppler shift based on the source and observer frequencies and the relative velocity between them.

$$f_O = f_S \left( \frac{v \pm v_O}{v \pm v_S} \right) \qquad \text{Equation 9}$$

In equation 9 above, $f_O$ can represent the frequency of the observer, $f_S$ can represent the frequency of the source, $v_O$ can represent the velocity of the observer, $v_S$ can represent the velocity of the source, and v can represent the speed of light in a vacuum. Using a free-space optical communications system to transmit messages between the Master Clock and the Slave Clock, the Doppler shift measurement can be used to correct for shifts of the received signal's wavelength caused by differential movement between the clocks. Therefore, such systems that also contain PTP Master and Slave Clocks could be used to correct the PTP path asymmetry computation. Using the terms from Equation 9 above, the PTP Master Clock can be modeled as the source and the PTP Slave clock can be modeled as the observer. The Doppler shift between these clocks can be expressed as a fractional frequency ratio as shown in equation 10 below:

$$F_{fract} = \frac{f_O}{f_S} \qquad \text{Equation 10}$$

Once the Doppler shift fractional frequency ratio between the source and observer terminals is known, it is possible to compute the differential velocity between them. If we assume that Doppler shift measurements are made relative to the source, (e.g., $v_S = 0$), Equation 10 can be rewritten as follows:

$$F_{fract} = \left( \frac{v \pm v_O}{v} \right) \qquad \text{Equation 11}$$

For the converging clock case where the observer (i.e., the Slave Clock) is moving toward the source (i.e., the Master Clock), the sign of ($v_O$) is positive. For the diverging clock case where the observer is moving away from the source, the sign of ($v_O$) is negative. The observer's velocity ($v_O$) can be determined once the fractional frequency difference is known using the following equation:

$$v_O = \pm (v \times F_{fract} - v) \qquad \text{Equation 12}$$

Note that for the converging clock case, the value of $F_{fract}$ is greater than 1 and the sign of $v_o$ is positive. For diverging clocks, the value of $F_{fract}$ is less than 1 and the sign of $v_o$ is negative. In one or more examples, once all PTP timestamps are known using the process outlined above with respect to FIG. 3, the value of $D_C$ can be computed using the following equation:

$$D_C = (t_3 - t_2) \times v_o \qquad \text{Equation 13}$$

The value of $T_C$ can next be computed by using Equation 4. In one or more examples, the sign of $T_C$ is positive for converging clocks and negative for diverging clocks. In one or more examples, the sign of $T_C$ changes in a similar way when computing the corrected value of the reverse mean path delay. For synchronization systems with converging paths, the sign of $T_C$ in Equation 6 <meanPathDelay_cR1> is positive. Likewise, for synchronization systems with diverging paths, the sign of $T_C$ in Equation 8 <meanPathDelay_cR2> is negative. Using the proposed Doppler shift measurement method to compute $T_C$, the sign is correctly determined. Therefore, the Doppler shift corrected value of the reverse mean path delay <meanPathDelay_cR> for synchronization systems can be computed using the following equation:

$$\text{<meanPathDelay\_cR>} = [(t_2 - t_1) + (t_4 - t_3) + T_C]/2 = [(t_2 - t_3) + (t_4 - t_1) + T_C]/2 \qquad \text{Equation 14}$$

Figure 6:
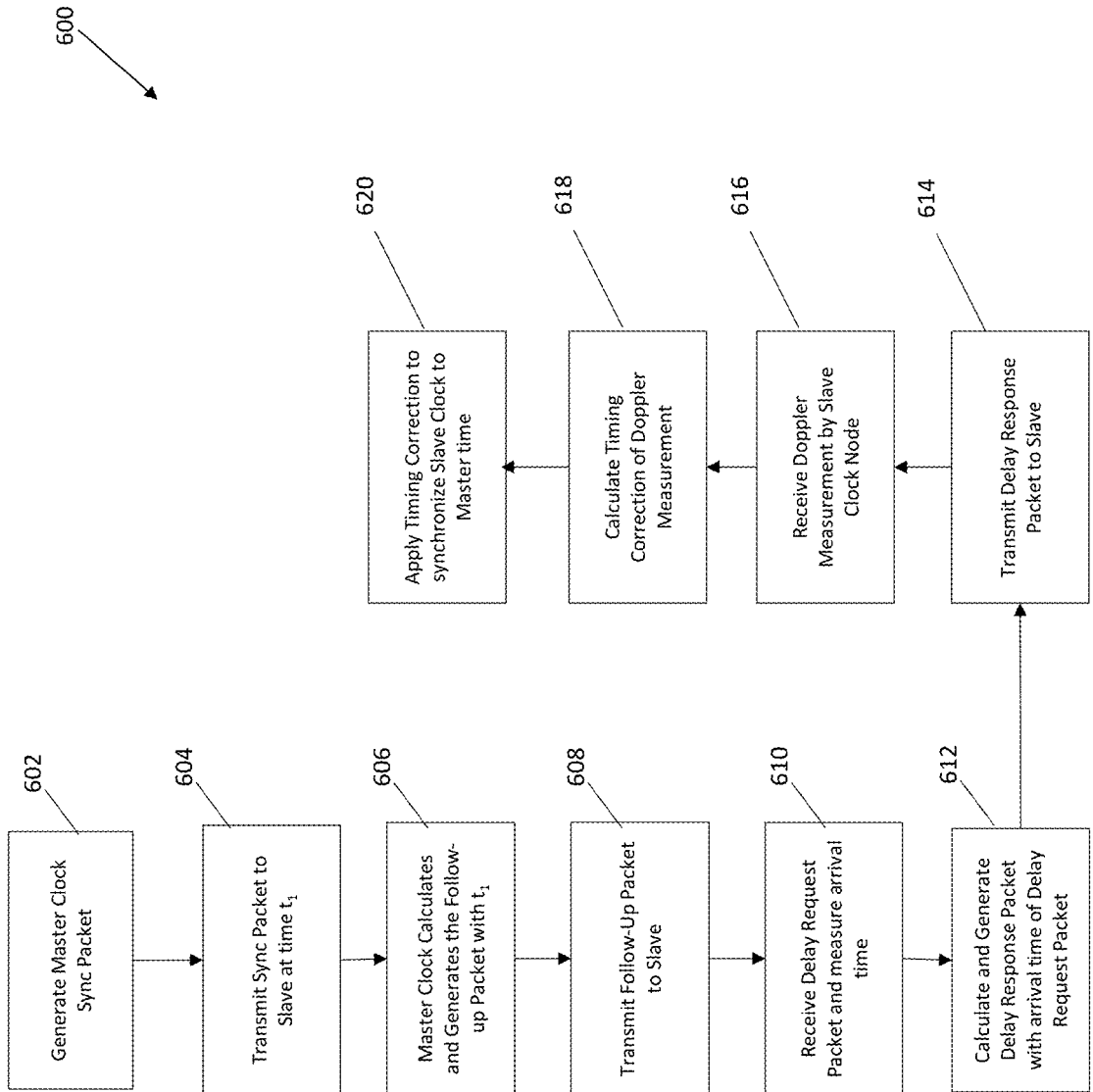
FIG. 6 illustrates an exemplary process for utilizing Doppler shift to apply path correction to a PTP synchronization process according to examples of the disclosure.

Equation 14 above can thus be used to correct the determined reverse path delay such that the forward path delay experienced by the Sync packet can be calculated correctly to accurately synchronize the Master Clock to the Slave Clock in the instance where the Slave Clock is moving either towards or away from the Master Clock. FIG. 6 illustrates an exemplary process for utilizing Doppler shift to apply path correction to a PTP synchronization process according to examples of the disclosure. In one or more examples, the process 600 can commence similarly to process 300, insofar as the sync packet, the follow-up packet, the delay request packet, and the delay response packet can be generated and passed between the Master and Slave Clocks. Thus, in one or more examples, the steps 602, 604, 606, 608, 610, 612, and 614 of process 600 are substantially similar to their counterpart steps 302, 304, 306, 308, 310, 312, and 314 of process 300. Thus, the discussion relation to those steps can be referenced above.

In one or more examples, once the delay response packet has been transmitted to the Slave Clock at step 614, the process 600 can move to step 616 wherein a Doppler measurement is received at the Slave clock. In one or more examples, the Doppler shift measurement can represent the shift in frequency observed at the Slave Clock, from a signal transmitted by the Master Clock.

In one or more examples, once the Doppler measurement is received at step 616, the process 600 can move to step 618 wherein a timing correction is applied to the reverse path delay calculation, calculated using equations 10-13 described above. In one or more examples, once the timing correction is calculated at step 618, the process 600 can move to step 620 wherein the calculated timing correction is applied to the mean path delay calculation to synchronize the Slave clock to the Master time as described above with respect to equation 14 as described above.

In one or more examples, the messages and timestamps exchanged by PTP timing systems can also be used to simultaneously support distance measurements used by ranging systems. Ranging systems can be employed to determine the distance between two objects. In one or more examples, ranging systems can be employed to determine the distance between the Master Clock (i.e., the terminal hosting the Master Clock) and the Slave Clock (i.e., the terminal hosting the Slave Clock). In ranging systems, the distance measurement may require that the "current" path distance be used (i.e., the distance between the Slave and Master Clock when the delay request packet is transmitted). However, the process described above with respect to FIG. 6 which is employed to synchronize the Slave Clock to the Master Clock is configured to determine the forward path delay (i.e., the distance between the Master Clock and the Slave Clock when the initial Sync packet is transmitted). Thus, in one or more examples, the path asymmetry measurement and compensation scheme for ranging systems can be based on correcting the forward path delay rather than correcting the reverse path delay as described above for PTP synchronization. As described in further detail below, the information derived from the PTP synchronization process coupled with Doppler shift measurements can also be used to generate ranging information between the Master Clock and the Slave Clock in scenarios wherein the position of the Master Clock and Slave Clock relative to one another is converging or diverging.

FIG. 7 illustrates an exemplary timing diagram for using clock synchronization information to determine ranging information according to examples of the disclosure in a context where the Master Clock and Slave Clocks are converging according to examples of the disclosure. Similar to the example of FIG. 4, the example timing diagram 700 of FIG. 7 illustrates a scenario in which the Slave Clock 704 is moving at a velocity V2 and is converging to the Master Clock 702, which is moving at a velocity V1 (i.e., the relative distance between the two vectors is decreasing with time.)

In one or more examples, and as illustrated in timing diagram 700, the PTP process can be executed between the Master Clock and the Slave Clock as described above. In one or more examples, upon the completion of the PTP synchronization, the Slave Clock will have time values for timestamps $t_1$, $t_2$, $t_3$, and $t_4$ as described above with respect to process 300 of FIG. 3. In the case of converging Slave and Master Clocks, the reverse path distance $D_R$ indicated at 708 is shorter than the forward path distance DF indicated at 706 by length $D_C$ as indicated at 710. Since the $D_R$ 508 distance is the "current" distance value (i.e., the time at which the distance is measured in a ranging system), a correction time value needs to be applied to the forward path to compute the forward path corrected value of the mean path delay <meanPathDelay_cF1>. Therefore, the relationship between the forward path ($D_F$), reverse path ($D_R$) and correction path ($D_C$) distances can be summarized by the following equation:

$$D_R = D_F - D_C \hspace{2cm} \text{Equation 15}$$

In one or more examples, the path delay $T_C$ over distance $D_C$ can be computed using equation 4 above. The resulting value of $T_C$ can be used to correct for the path asymmetry between $t_{ms}$ (the forward path delay) and $t_{sm}$ (the reverse path delay) by decreasing the value of the forward path as indicated by equation 16 below.

$$t_{sm} = t_{ms} - T_C \hspace{2cm} \text{Equation 16}$$

In one or more examples, and using the PTP timestamps and the value of $T_C$ (obtained from measuring the Doppler shift between the Master and Slave Clocks), the forward path corrected value of the mean path delay <meanPathDelay_cF1> can be computed using the following equation:

$$<\text{meanPathDelay\_cF}> = [(t_2 - t_1) + (t_4 - t_3) - T_C]/2 = [(t_2 - t_3) + (t_4 - t_1) - T_C]/2 \hspace{1cm} \text{Equation 17}$$

In one or more examples, using the mean path delay computed above with respect to Equation 1, the value of the range (i.e., the distance between the Master Clock and the Slave Clock) can be computed using the following equation:

$$<\text{Range1}> = <\text{meanPathDelay\_cF1}> \times c \hspace{1cm} \text{Equation 18}$$

In one or more examples, the value of <Range1> can be computed for time $t_3$. In other words, since the distance between the Master and Slave Clocks is changing, the value of <Range1> can represent the distance at time $t_3$ but may not be valid for other moments in time since the distance between the Master and Slave Clocks is decreasing with time. In one or more examples, the computation of equation 18 can only be made upon receipt of the Delay_Resp message at time $t_5$ indicated at 712. Due to the continual movement between the Master and Slave Clocks, the actual range at time $t_5$ may be different than at time $t_3$ and thus the ranging measurement may lag the actual distance between the Master and Slave Clocks.

In one or more examples, while the initial ranging measurement may require that the full PTP process be executed, subsequent updates to the range measurement may not require that the PTP process be performed again. For example, if the differential velocity $v_D$ indicated at 714 between the Master and Slave Clocks is known at time $t_5$, the difference in distance $D_U$ indicated at 716 can be computed and used to update the last computed range value <Range_update1> as shown in the following equations:

$$D_U = (t_5 - t_3) \times v_D \hspace{2cm} \text{Equation 19}$$

$$<\text{Range\_update1}> = <\text{Range1}> + (t_5 - t_3) \times v_D \hspace{1cm} \text{Equation 20}$$

Generally, for any value of time $t_R$ after time $t_5$ (e.g., $t_5+$)_the value of <Range_update1> can be computed using the following equations:

$$D_U=(t_R-t_3)\times v_D \qquad \text{Equation 21}$$

$$\text{<Range\_update1>=<Range1>}+D_U \qquad \text{Equation 22}$$

FIG. 8 illustrates an exemplary timing diagram for using clock synchronization information to determine ranging information according to examples of the disclosure in a context where the Master Clock and Slave Clocks are diverging according to examples of the disclosure. The timing diagram 800 of FIG. 8 illustrates the case where two PTP terminals have movement vectors that are diverging as indicated at vector V1 (indicated at 802) and vector V2 (indicated at 804.) In one or more examples, the relative distance between these two vectors increases over time. Since the distance between the Master and Slave Clocks is increasing with time, the path distance for the Sync Message $D_F$ indicated at 806 is less than the distance measured by the Delay_Req and Delay_Resp mechanism $D_R$ indicated at 808.

The timing diagram 800 of FIG. 8 illustrates how PTP timestamps can be used to support ranging between diverging terminals. In the example of diverging terminals, the reverse path distance $D_R$ indicated at 808 is longer than the forward path distance $D_F$ (indicated at 806) by length $D_C$ as indicated at 810. Since the $D_R$ distance is the "current" distance value, a correction time value needs to be applied to the forward path to compute the forward path corrected value of the mean path delay <meanPathDelay_cF2>. Therefore, the relationship between the forward path $D_F$, reverse path $D_R$ and correction path ($D_C$) distances can be summarized by the following equation:

$$D_R=D_F+D_C \qquad \text{Equation 23}$$

In one or more examples, equation 4 above can be used to compute the path delay based on the distance $D_C$. As described above $T_C$ can be acquired by measuring the Doppler shift between the Master and Slave Clock terminals as described above. In one or more examples, and in the context of diverging clocks, $T_C$ can be used to correct for the path asymmetry between $t_{ms}$ (forward delay) and $t_{sm}$ (reverse delay) by increasing the value of the forward path as shown in the following equation:

$$t_{sm}=t_{ms}+T_C \qquad \text{Equation 24}$$

Using the PTP timestamps and the value of $T_C$ (derived from the measured Doppler shift), the forward path corrected value of the mean path delay <meanPathDelay_cF2> can be computed using the following equation:

$$\text{<meanPathDelay\_cF2>}=[(t_2t_1)+(t_4t_3)+T_C]/2=[(t_2-t_3)+(t_4t_1)+T_C]/2 \qquad \text{Equation 25}$$

Using the mean path delay calculated above at equation 25, the value of the range between the Master and Slave Clocks can be computed at time $t_5$ using the following equation:

$$\text{<Range\_update2>=<Range2>}+(t_5-t_3)\times v_D \qquad \text{Equation 26}$$

Similar to the example of converging terminals, the range calculation in the context of diverging terminals <Range_update2> can be calculated for any time $t_R$ after time $t_5$ (e.g., $t_{5+}$) using the equations below:

$$D_U=(t_Rt_3)\times v_D \qquad \text{Equation 27}$$

$$\text{<Range\_update2>=<Range2>}+D_U \qquad \text{Equation 28}$$

Figure 9:
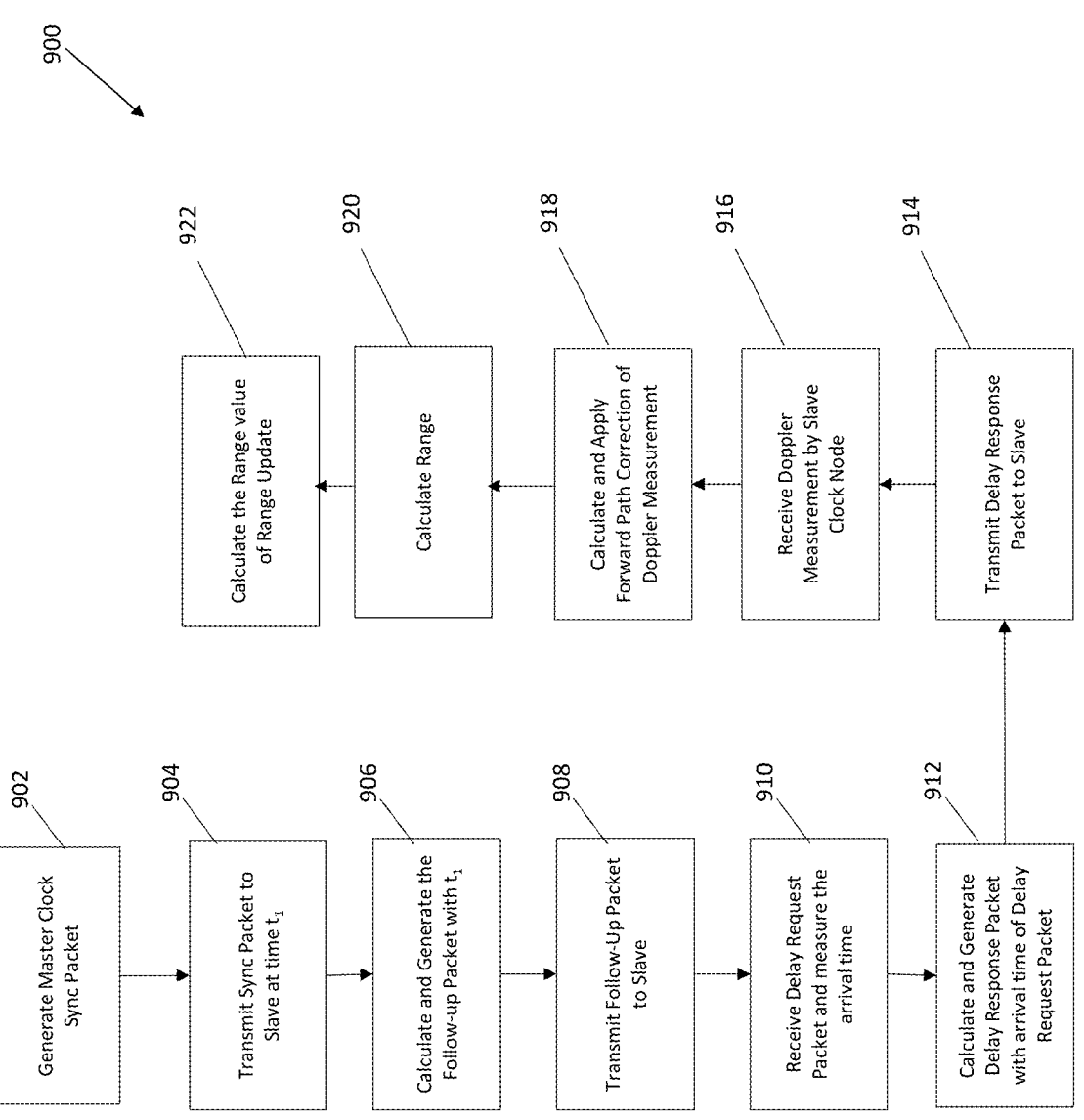
FIG. 9 illustrates an exemplary process for utilizing Doppler shift to apply path correction to a range calculation process according to examples of the disclosure.

FIG. 9 illustrates an exemplary process for utilizing Doppler shift to apply path correction to a range calculation process according to examples of the disclosure. In one or more examples, the process 900 can commence similarly to process 300, insofar as the Sync packet, the follow-up packet, the delay request packet, and the delay response packet can be generated and passed between the Master and Slave Clocks. Thus, in one or more examples, the steps 902, 904, 906, 908, 910, 912, and 914 of process 900 are substantially similar to their counterpart steps 302, 304, 306, 308, 310, 312, and 314 of process 300. Thus, the discussion relation to those steps can be referenced above.

In one or more examples, once the delay response packet has been transmitted to the Slave Clock at step 914, the process 900 can move to step 916 wherein a Doppler shift measurement is received at the Slave Clock. In one or more examples, the Doppler shift measurement can represent the shift in frequency observed at the Slave Clock, from a signal transmitted by the Master Clock.

In one or more examples, once the Doppler shift measurement is received at step 916, the process 900 can move to step 918 wherein a distance correction is applied to the forward path timing calculation, calculated using equation 16 (in the case of converging clocks) or equation 24 (in the case of diverging clocks) described above. In one or more examples, once the timing correction is calculated at step 918, the process 900 can move to step 920 wherein the calculated timing correction is applied to the range calculation as described above for both the converging and diverging scenarios as described above.

In one or more examples, once the range has been calculated in step 920, the process 900 can move to step 922 where a range update can be performed between full exchanges of PTP timestamps. The range update measures the path distance between timestamps $t_5$ and $t_3$ and adds this value to the value of range computed at step 920.

Figure 10:
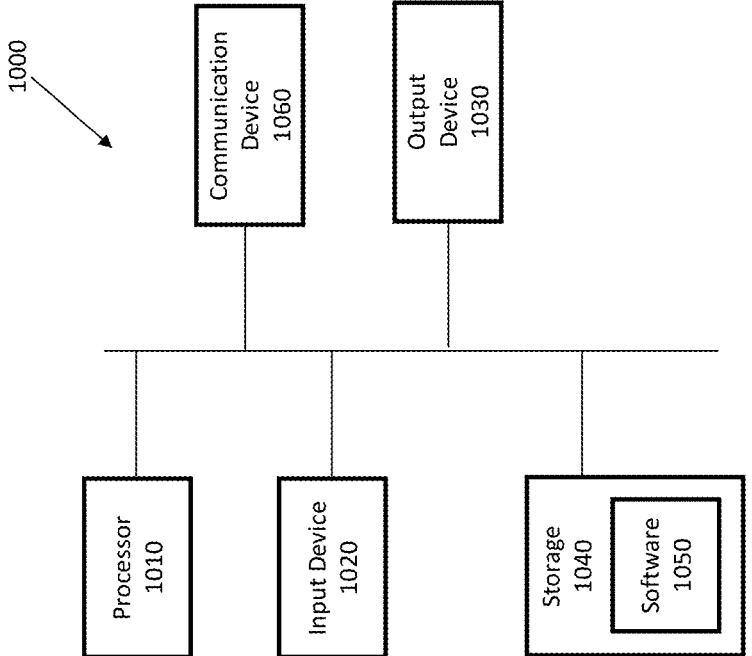
FIG. 10 illustrates an example of a computing device in accordance with one or more examples of the disclosure.

FIG. 10 illustrates an example of a computing device in accordance with one embodiment. Device 1000 can be a host computer connected to a network. Device 1000 can be a client computer or a server. As shown in FIG. 10, device 1000 can be any suitable type of microprocessor-based device, such as a personal computer, workstation, server, or handheld computing device (portable electronic device) such as a phone or tablet. The device can include, for example, one or more of processor 1010, input device 1020, output device 1030, storage 1040, and communication device 1060. Input device 1020 and output device 1030 can generally correspond to those described above and can either be connectable or integrated with the computer.

Input device 1020 can be any suitable device that provides input, such as a touch screen, keyboard or keypad, mouse, or voice-recognition device. Output device 1030 can be any suitable device that provides output, such as a touch screen, haptics device, or speaker.

Storage 1040 can be any suitable device that provides storage, such as an electrical, magnetic, or optical memory, including a RAM, cache, hard drive, or removable storage disk. Communication device 1060 can include any suitable device capable of transmitting and receiving signals over a network, such as a network interface chip or device. The components of the computer can be connected in any suitable manner, such as via a physical bus or wirelessly.

Software 1050, which can be stored in storage 1040 and executed by processor 1010, can include, for example, the programming that embodies the functionality of the present disclosure (e.g., as embodied in the devices as described above).

Software 1050 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 1040, that can contain or store programming for use by or in connection with an instruction execution system, apparatus, or device.

Software 1050 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 1000 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, Ethernet, T1 or T3 lines, cable networks, DSL, or telephone lines.

Device 1000 can implement any operating system suitable for operating on the network. Software 1050 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

This application discloses several numerical ranges in the text and figures. The numerical ranges disclosed inherently support any range or value within the disclosed numerical ranges, including the endpoints, even though a precise range limitation is not stated verbatim in the specification, because this disclosure can be practiced throughout the disclosed numerical ranges.

The above description is presented to enable a person skilled in the art to make and use the disclosure, and it is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown but is to be accorded the widest scope consistent with the principles and features disclosed herein. Finally, the entire disclosure of the patents and publications referred in this application are hereby incorporated herein by reference.

What is claimed is:

1. A method for synchronizing a first clock and a second clock, the method comprising:
   determining a forward transmission path delay for communications transmitted from the first clock to the second clock, wherein the first clock and the second clock are moving relative to one another;
   synchronizing the second clock to the first clock based on the determined forward transmission path delay;
   receiving a Doppler shift measurement, wherein the Doppler shift measurement is based on a signal transmitted from the first clock and received at the second clock;
   determining a transmission path delay correction factor based on the received Doppler shift measurement;
   adjusting the forward transmission path delay by adding the transmission path delay correction factor to the forward transmission path delay; and
   adjusting a time of the second clock based on the adjusted forward transmission path delay.

2. The method of claim 1, wherein determining the forward transmission path delay for communications transmitted from the first clock to the second clock comprises:
   generating a Sync packet at the first clock, wherein the synchronization packet comprises time stamp information from the first clock;
   transmitting the generated Sync packet to the second clock;
   determining an internal delay of the signal transmitted from the first clock, wherein the determined internal delay is based on an amount time measured between when the Sync packet was generated and when the Sync packet was transmitted;
   receiving a delay request packet from the second clock at the first clock; and
   determining the forward transmission path delay between the first clock and the second clock based on the received delay request packet.

3. The method of claim 2, wherein adjusting the time of the second clock based on the determined transmission path delay correction factor comprises:
   transmitting a delay response packet to the second clock from the first clock, wherein the delay response packet comprises the determined transmission path delay; and
   adjusting the time of the second clock based on the delay response packet received by the second clock.

4. The method of claim 1, wherein the received Doppler shift measurement is based on a change in the received frequency of the signal transmitted from the first clock to the second clock.

5. The method of claim 1, comprising determining that a distance between the first clock and the second clock is increasing or decreasing based on the received Doppler shift measurement.

6. The method of claim 1, wherein adjusting the time of the second clock based on the determined transmission path delay correction factor comprises:

determining a reverse transmission path delay for communications transmitted from the second clock to the first clock; and modifying the determined reverse transmission path delay based on the received Doppler shift measurement.

7. A method for determining a range distance between a first clock and a second clock, the method comprising:

determining a forward transmission path delay for communications transmitted from the first clock to the second clock, wherein the first clock and the second clock are moving relative to one another;

synchronizing the second clock to the first clock based on the determined forward transmission path delay;

receiving a Doppler shift measurement, wherein the Doppler shift measurement is based on a signal transmitted from the first clock and received at the second clock;

determining a transmission path delay correction factor based on the received Doppler shift measurement;

adjusting the forward transmission path delay by adding the transmission path delay correction factor to the forward transmission path delay; and determining a range distance between the first clock and the second clock based on the adjusted forward transmission path delay.

8. The method of claim 7, wherein determining the forward transmission path delay for communications transmitted from the first clock to the second clock comprises:

generating a synchronization packet at the first clock, wherein the synchronization packet comprises time stamp information from the first clock;

transmitting the generated synchronization packet to the second clock;

determining an internal delay of the signal transmitted from the first clock, wherein the determined internal delay is based on an amount time measured between when the synchronization packet was generated and when the synchronization packet was transmitted;

receiving a delay request packet from the second clock at the first clock; and determining the forward transmission path delay between the first clock and the second clock based on the received delay request packet.

9. The method of claim 8, wherein adjusting the time of the second clock based on the determined transmission path delay correction factor comprises:

transmitting a delay response packet to the second clock from the first clock, wherein the delay response packet comprises the determined transmission path delay; and adjusting the time of the second clock based on the received delay response packet.

10. The method of claim 7, wherein the received Doppler shift measurement is based on a change in the frequency of the signal transmitted from the first clock to the second clock.

11. The method of claim 7, wherein the method comprises determining that a distance between the first clock and the second clock is increasing or decreasing based on the received Doppler shift measurement.

12. The method of claim 7, wherein determining the range distance between the first clock and the second clock based on the determined transmission path delay correction factor comprises:

determining a reverse transmission path delay for communications transmitted from the second clock to the first clock; and modifying the determined reverse transmission path delay based on the received Doppler shift measurement.

13. A system for synchronizing a first clock and a second clock, the system comprising:

a memory;

one or more processors;

wherein the memory stores one or more programs that when executed by the one or more processors, cause the one or more processors to:

determine a forward transmission path delay for communications transmitted from the first clock to the second clock, wherein the first clock and the second clock are moving relative to one another;

synchronize the second clock to the first clock based on the determined forward transmission path delay;

receive a Doppler shift measurement, wherein the Doppler shift measurement is based on a signal transmitted from the first clock and received at the second clock;

determine a transmission path delay correction factor based on the received Doppler shift measurement;

adjusting the forward transmission path delay by adding the transmission path delay correction factor to the forward transmission path delay; and adjust a time of the second clock based on the adjusted forward transmission path delay.

14. The system of claim 13, wherein determining the forward transmission path delay for communications transmitted from the first clock to the second clock comprises:

generating a synchronization packet at the first clock, wherein the synchronization packet comprises time stamp information from the first clock;

transmitting the generated synchronization packet to the second clock;

determining an internal delay of the signal transmitted from the first clock, wherein the determined internal delay is based on an amount time measured between when the synchronization packet was generated and when the synchronization packet was transmitted;

receiving a delay request packet from the second clock at the first clock; and determining the forward transmission path delay between the first clock and the second clock based on the received delay request packet.

15. The system of claim 14, wherein adjusting the time of the second clock based on the determined transmission path delay correction factor comprises:

transmitting a delay response packet to the second clock from the first clock, wherein the delay response packet comprises the determined transmission path delay; and adjusting the time of the second clock based on the delay response packet received by the second clock.

16. The system of claim 13, wherein the received Doppler shift measurement is based on a change in the frequency of the signal transmitted from the first clock to the second clock.

17. The system of claim 13, wherein the one or more processors are caused to determine that a distance between the first clock and the second clock is increasing or decreasing based on the received Doppler shift measurement.

18. The system of claim 13, wherein adjusting the time of the second clock based on the determined transmission path delay correction factor comprises:

determining a reverse transmission path delay for communications transmitted from the second clock to the first clock; and modifying the determined reverse transmission path delay based on the received Doppler shift measurement.

19. A system for synchronizing a first clock and a second clock, the system comprising:

a memory;

one or more processors;

wherein the memory stores one or more programs that when executed by the one or more processors, cause the one or more processors to:

determine a forward transmission path delay for communications transmitted from the first clock to the second clock, wherein the first clock and the second clock are moving relative to one another;

synchronize the second clock to the first clock based on the determined forward transmission path delay;

receive a Doppler shift measurement, wherein the Doppler shift measurement is based on a signal transmitted from the first clock and received at the second clock;

determine a transmission path delay correction factor based on the received Doppler shift measurement;

adjusting the forward transmission path delay by adding the transmission path delay correction factor to the forward transmission path delay; and determine a range distance between the first clock and the second clock based on the adjusted forward transmission path delay.

20. The system of claim 19, wherein determining the forward transmission path delay for communications transmitted from the first clock to the second clock comprises:

generating a Sync packet at the first clock, wherein the Sync packet comprises time stamp information from the first clock;

transmitting the generated Sync packet to the second clock;

determining an internal delay of the signal transmitted from the first clock signal, wherein the determined internal delay is based on an amount time measured between when the Sync packet was generated and when the Sync packet was transmitted;

receiving a delay request packet from the second clock at the first clock; and determining the forward transmission path delay between the first clock and the second clock based on the received delay request packet.

21. The system of claim 20, wherein adjusting the time of the second clock based on the determined transmission path delay correction factor comprises:

transmitting a delay response packet to the second clock from the first clock, wherein the delay response packet comprises the determined transmission path delay; and adjusting the time of the second clock based on the received delay response packet.

22. The system of claim 19, wherein the received Doppler shift measurement is based on a change in the frequency of the signal transmitted from the first clock to the second clock.

23. The system of claim 19, wherein the one or more processors are caused to determine that a distance between the first clock and the second clock is increasing or decreasing based on the received Doppler shift measurement.

24. The system of claim 19, wherein determining the range distance between the first clock and the second clock based on the determined transmission path delay correction factor comprises:

determining a reverse transmission path delay for communications transmitted from the second clock to the first clock; and modifying the determined reverse transmission path delay based on the received Doppler shift measurement.

25. The method of claim 1, wherein the transmission path delay correction factor is positive when the first clock and the second clock are converging and wherein the transmission path delay correction factor is negative when the first clock and the second clock are diverging.

* * * * *